United States Patent
Bacallao et al.

(10) Patent No.: US 10,084,499 B2
(45) Date of Patent: Sep. 25, 2018

(54) MOBILE COMPUTING DEVICE HOLDER

(71) Applicant: Walmart Apollo, LLC, Bentonville, AR (US)

(72) Inventors: Yurgis Mauro Bacallao, Centerton, AR (US); Stephen Tyler Caution, Bentonville, AR (US); Joshua David Osmon, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/657,693

(22) Filed: Jul. 24, 2017

(65) Prior Publication Data
US 2018/0034494 A1    Feb. 1, 2018

Related U.S. Application Data

(63) Continuation-in-part of application No. 29/572,493, filed on Jul. 28, 2016, now Pat. No. Des. 811,199.
(Continued)

(51) Int. Cl.
*H04B 1/00* (2006.01)
*H04B 1/3877* (2015.01)
*A47B 97/00* (2006.01)

(52) U.S. Cl.
CPC ........... *H04B 1/3877* (2013.01); *A47B 97/00* (2013.01); *A47B 2097/006* (2013.01)

(58) Field of Classification Search
CPC . H04B 1/3877; A47B 97/00; A47B 2097/006; B65D 8/053
(Continued)

(56) References Cited

U.S. PATENT DOCUMENTS 1,681,210 A * 8/1928 Banks ...................... A24F 19/00
                                                        108/26
1,715,715 A * 6/1929 McVey ................... A47B 13/16
                                                         131/241
(Continued)

OTHER PUBLICATIONS

Tram-browning, "L-Bracket 1255 ¾ Hole Stainless Steel NMO ¾ Hole Mount L Bracket Mobile Antennas Motorola Kenwood Vertex HYT for UHF VHF Coam NMO Mount Cable Mobile Antennas Car Truck Hood install by tram-browning", Amazon.com, first accessed on May 27, 2016; 5 pages.
(Continued)

*Primary Examiner* — Anita M King
(74) *Attorney, Agent, or Firm* — Schmeiser, Olsen & Watts LLP

(57) ABSTRACT

Described is a mobile computing device holder that mounts to a piece of furniture, specifically to the corner of a piece of furniture. The mobile computing device holder holds a mobile computing device base, such as a docking station or charger, and a mobile computing device. The mobile computing device holder includes a corner mount fixture that mounts to a corner of a piece of furniture and holds the mobile computing device base such that the mobile computing device is cradled in the mobile computing device base. The mobile computing device holder also includes a tether device that tethers the mobile computing device to the mobile computing device base so the mobile computing device can be used, but cannot be moved more than the length of the tethering device from the corner mount fixture.

20 Claims, 14 Drawing Sheets

Related U.S. Application Data

(60) Provisional application No. 62/367,754, filed on Jul. 28, 2016, provisional application No. 62/367,757, filed on Jul. 28, 2016.

(58) Field of Classification Search
USPC .......................................... 248/220.1, 447.1
See application file for complete search history.

(56) References Cited

U.S. PATENT DOCUMENTS

| | | | |
|---|---|---|---|
| 1,922,935 A * | 8/1933 | Du Bois | A47B 96/062 |
| | | | 248/220.1 |
| 1,937,994 A * | 12/1933 | Taylor | A47B 13/16 |
| | | | 108/26 |
| 2,677,520 A * | 5/1954 | Marcy | A47B 13/16 |
| | | | 248/220.1 |
| 2,891,756 A * | 6/1959 | Packard | D06F 81/12 |
| | | | 248/220.1 |
| 3,076,627 A | 2/1963 | Huron | |
| D242,510 S | 11/1976 | Enckler | |
| D287,817 S | 1/1987 | Henin | |
| D299,809 S | 2/1989 | Hagedorn | |
| D327,214 S | 6/1992 | Stuart | |
| D357,400 S | 4/1995 | Sachs | |
| 5,454,537 A * | 10/1995 | Meeker | A47B 13/16 |
| | | | 248/215 |
| D408,266 S | 4/1999 | Santiago | |
| D420,278 S | 2/2000 | Coffy et al. | |
| D427,888 S | 7/2000 | Hannon | |
| D432,901 S | 10/2000 | Mcdonald | |
| 6,285,758 B1 | 9/2001 | Lu | |
| 6,511,251 B2 | 1/2003 | Bowell | |
| 6,769,750 B2 | 8/2004 | Hughes et al. | |
| 6,957,978 B2 | 10/2005 | Zoller | |
| D513,969 S | 1/2006 | Schurr et al. | |
| D516,023 S | 2/2006 | Quinn | |
| 7,154,039 B1 | 12/2006 | Marszalek et al. | |
| D542,632 S | 5/2007 | Hill | |
| D546,366 S | 7/2007 | Dittmer | |
| 7,264,863 B2 * | 9/2007 | Haymond | A47B 95/043 |
| | | | 206/453 |
| D573,008 S | 7/2008 | Sipe | |
| D574,222 S | 8/2008 | Golias, Jr. et al. | |
| D606,384 S | 12/2009 | Antonic | |
| D608,111 S | 1/2010 | Rubin | |
| D643,708 S | 8/2011 | Hecht | |
| 8,077,449 B2 | 12/2011 | Mi et al. | |
| D674,637 S | 1/2013 | London | |
| 8,548,536 B1 | 10/2013 | Gunnip | |
| D705,040 S | 5/2014 | Konrad et al. | |
| 8,713,858 B1 | 5/2014 | Xie | |
| 8,729,852 B2 | 5/2014 | Tsai et al. | |
| D711,736 S | 8/2014 | Strom et al. | |
| D714,616 S | 10/2014 | Walker et al. | |
| D726,174 S | 4/2015 | Wahlin | |
| 9,022,337 B2 | 5/2015 | Petruskavich | |
| D734,305 S | 7/2015 | Wengreen | |
| 9,115,846 B2 | 8/2015 | Maier et al. | |
| 9,128,668 B2 | 9/2015 | Johnson | |
| 9,131,195 B2 | 9/2015 | Wengreen et al. | |
| 9,165,174 B2 | 10/2015 | Huck | |
| 9,179,565 B2 | 11/2015 | Cho | |
| D744,317 S | 12/2015 | Densberger et al. | |
| D744,459 S | 12/2015 | Cummings et al. | |
| 9,272,829 B2 | 3/2016 | Wynnick et al. | |
| D761,236 S | 7/2016 | Wengreen | |
| D795,266 S | 8/2017 | Williams | |
| D796,302 S | 9/2017 | Bright et al. | |
| 2002/0148935 A1 | 10/2002 | Chambers | |
| 2008/0079388 A1 | 4/2008 | Samowsky et al. | |
| 2011/0157805 A1 | 6/2011 | Mi et al. | |
| 2013/0093386 A1 | 4/2013 | Tsai et al. | |
| 2013/0153720 A1 | 6/2013 | Petruskavich | |
| 2013/0161054 A1 | 6/2013 | Allison et al. | |
| 2013/0278050 A1 | 10/2013 | Maier et al. | |
| 2014/0091193 A1 | 4/2014 | Simon | |
| 2015/0041622 A1 | 2/2015 | Mulhern et al. | |
| 2015/0070839 A1 | 3/2015 | Johnson | |
| 2015/0144754 A1 | 5/2015 | Elharar | |
| 2015/0201113 A1 | 7/2015 | Wood | |
| 2015/0289396 A1 | 10/2015 | Hwang et al. | |
| 2016/0204636 A1 | 7/2016 | Allen et al. | |
| 2017/0339937 A1 | 11/2017 | Erdmann | |
| 2017/0347780 A1 * | 12/2017 | Bacallao | A45F 5/10 |

OTHER PUBLICATIONS

10 Units crank angle bracket plastic frame angular DIY model accessories, AliExpress.com, first accessed May 27, 2016; 12 pages.

Repe, "High Rated Brush Coating Finish Plastic Composite Railing Metal L Shape WPC Clip Accessory", TimberCompositeDecking.com, first accessed May 27, 2016; 2 pages.

Product Photos, DeckMaster.com, first accessed May 27, 2016; 10 pages.

Profis, Sharon, "How to mount your smartphone on a tripod (DIY)", CNET.com, Mar. 26, 2014; 5 pages.

vGaurd, "vG-SDM003 Square Security Display Magnetic Mounting Holder for Cell Phone", WelGaurd.com, first accessed on May 27, 2016; 7 pages.

vGuard, "vG-SDM001 Small Oval Security Display Magnet Mount + Pull Box tehter", AliExpress.com, first accessed on May 27, 2016; 2 pages.

vGuard, "vG-SDM004 Small Round Security Display Magnet Mount + Pull Box", WelGaurd.com, first accessed on May 27, 2016; 6 pages.

AnchorPad, "vRT Medium Retractable Tether with 29.5 Inch Cable for iPods & iPhones", Amazon.com, first accessed on May 27, 2016; 5 pages.

Maurerpe, "Wall Mount for Vtech 6419 Cordless Phone", MakerBot Thingiverse, Apr. 20, 2013; 6 pages.

Generic, "Television/Air Conditioner Remote Control Holder Wall Mount-Storage Box", Amazon.com, first accessed May 27, 2016; 6 pages.

Zazz, "Zazz Wall Mount for iPad/Kindle and Tablets (Black)", Amazon.com, first accessed on May 27, 2016; 5 pages.

Plastic Sensor 2.0 Wall Mount Stand Holder for Zbox One Kinect 2.0—Black, Deal Extreme, DX.com, first accessed on May 28, 2016; 4 pages.

Sea-Dog, "Sea-Dog Removable Table Brackets—Stainless Steel", DownwindMarine.com, first accessed on May 28, 2016; 1 page.

Series Accessories: Developed for your Dynaudio loudspeakers, Dynaudio.com, first accessed on May 28, 2016; 6 pages.

Video Mount Products Vented Wall Mount Shelf, CableOrganizer.com, first accessed on May 28, 2016; 3 pages.

Cell Phone Wall Charger Adapter Charging Holder Hanging Support (2-Piece), first accessed on May 28, 2016; 2 pages.

Mid-Century Meets Modern: Gidloof Originals—Tiagosen, Design-Milk.com, Mar. 4, 2013; 14 pages.

"Inon Double Hole Rubber bushing (for fiber optic cable)," Backscatter.com, accessed on Apr. 25, 20171 2 pages.

Redlinecarparts, "BMW 320D 99-06 Front Wishbone Bush with Bracket LH O," Ebay.com, accessed on Apr. 24, 2017; 5 pages.

Dardytrading, "Anti-lost Pull Box Anti Theft Recoiler Retracting Display Cable Retracting Security Cable Merchandise Security Tether Security Recoiler," DHGate.com, accessed on Apr. 24, 2017; 11 pages.

"Freedom Micro™," MobileTechnic.com, Mobile Technologies Inc., accessed on Apr. 24, 2017; 5 pages.

"Recent RTF News and Updates: Open display, retail smartphone security devices now produced in Brazil," RTFGlobal.com, accessed on Apr. 24, 2017; 3 pages.

Corner Bracket Levelers, 4 pack, Woodcraft.com, Woodcraft Supply LLC, accessed on Jun. 29, 2016; 2 pages.

HighPoint Corner Bracket Levelers 4-piece, Woodcraft.com, Woodcraft Supply LLC, accessed on Jun. 29, 2016; 2 pages.

(56) References Cited

OTHER PUBLICATIONS

Pack of 10 Heavy Duty Corner Braces 50mm Angle Bracket F Plate NEW, Ebay.com, White Hinge Ltd, accessed on Jun. 29, 2016; 4 pages.
Screw-on Corner Braces, 4-Pack, Rockler.com, Rockler Woodworking and Hardware, accessed on Jun. 29, 2016; 6 pages.
Glide Brackets and Systems, USFutaba.com, U.S. Futuba, Inc., accessed on Jun. 29, 2016; 2 pages.
Corner Brace 2-½×2-½×¾ in White Plastic, OvisOnline.com, OVIS division of WIM Corp, accessed on Jun. 29, 2016; 4 pages.
Notice of Allowance in U.S. Appl. No. 29/566,595, dated Jun. 30, 2017; 6 pages.
"Code Reader 2500 CR2500 512G_01 Barcode Scanner w/Charger + Handle," Ebay.com, accessed on Jun. 15, 2017; 4 pages.
"Wireless Laser Barcode Scanner Label Reader with Charger Base Handheld Barcode Scanning for Supermarket Shop," DHGate.com, accessed on Jun. 15, 2017; 3 pages.
Notice of Allowance in U.S. Appl. No. 29/572,493, dated Dec. 27, 2017; 8 pages.

\* cited by examiner

MOBILE COMPUTING DEVICE HOLDER

CROSS REFERENCE TO RELATED APPLICATION

This application is a continuation-in-part of U.S. design application Ser. No. 29/572,493 filed Jul. 28, 2016 to Applicant Wal-Mart Stores Inc., and entitled "Corner Mount Fixture", which is incorporated entirely herein by reference. This application claims priority to U.S. provisional patent application Ser. No. 62/367,754, filed Jul. 28, 2016 to Applicant Wal-Mart Stores Inc., and entitled "Corner Mount Fixture"; and to U.S. provisional patent application Ser. No. 62/367,757, filed Jul. 28, 2016 to Applicant Wal-Mart Stores Inc., and entitled "Mobile Computing Device Holder", each of which are incorporated entirely herein by reference.

BACKGROUND OF THE INVENTION

Technical Field

This invention relates to fixtures for holding mobile computing devices, and specifically to a mobile computing device holder that mounts to a piece of furniture and holds a mobile computing device base and a mobile computing device.

State of the Art

Mobile computing devices such as cellular telephones, personal computing devices, electronic scanner devices, tablets and other computing devices are in common use by individuals and businesses. These mobile computing devices are lightweight and easily carried by a person from one place to another. Mobile computing devices often have a base or charger unit that holds the mobile computing device when the mobile computing device is not being used. The base or charger unit holds, stores, and often charges the mobile computing device. In some situations, it is desirable to mount the base or charger unit to a piece of furniture so the mobile computing device is easily accessible. In specific situations, it is desirable to keep a mobile computing device in one location so the mobile computing device can be used by one or more individuals, but the individuals cannot remove the mobile computing device from the location. In these instances, it is desirable to tether the mobile computing device to a fixture so the mobile computing device cannot be moved from the desired location. Mobile computing devices do not usually have loops or couplers that can be used to tether the mobile computing device. Accordingly, it is desirable to have a holder for holding the mobile computing device and the mobile computing device base that is easily mounted to a piece of furniture, that is easy to mount the mobile computing device base to, and is easily constructed. It is also desirable to have a coupling apparatus that can be mounted to the mobile computing device to be used to tether the mobile computing device to the holder.

DETAILED DESCRIPTION OF EMBODIMENTS OF THE INVENTION

Embodiments of the disclosed invention relate to fixtures for holding mobile computing devices, and specifically to a mobile computing device holder that mounts to a piece of furniture and includes a mobile computing device base and a mobile computing device.

Disclosed is a mobile computing device holder that mounts to a piece of furniture, specifically to the corner of a piece of furniture. The mobile computing device holder includes a corner mount fixture that holds a mobile computing device base, such as a docking station or charger. The mobile computing device base holds a mobile computing device. The corner mount fixture of the mobile computing device holder mounts to a corner of a piece of furniture and holds the mobile computing device base such that the mobile computing device is cradled in the mobile computing device base. The mobile computing device holder also includes a coupling apparatus that is coupled to the mobile computing device, and a tether device coupled to both the mobile computing device base and the coupling apparatus. The tether device tethers the mobile computing device and coupling apparatus to the mobile computing device base so the mobile computing device can be used, but cannot be moved more than the length of the tethering device from the mobile computing device base.

The disclosed mobile computing device holder includes a means to hold a mobile computing device base, and a means to couple a mobile computing device to the mobile computing device base. The means to hold the mobile computing device base is coupled to a piece of furniture. In some embodiments, the means to hold the mobile computing device base is a means to support the mobile computing device base. In some embodiments, the means to hold the mobile computing device base is a means to support the mobile computing device base and the mobile computing device. In some embodiments, the means to hold the mobile computing device base includes a means to support the mobile computing device base, and a means to couple the means to support the mobile computing device base to a corner of a piece of furniture. In some embodiments, the means to couple the mobile computing device to the mobile computing device base is retractable.

Figure 1:
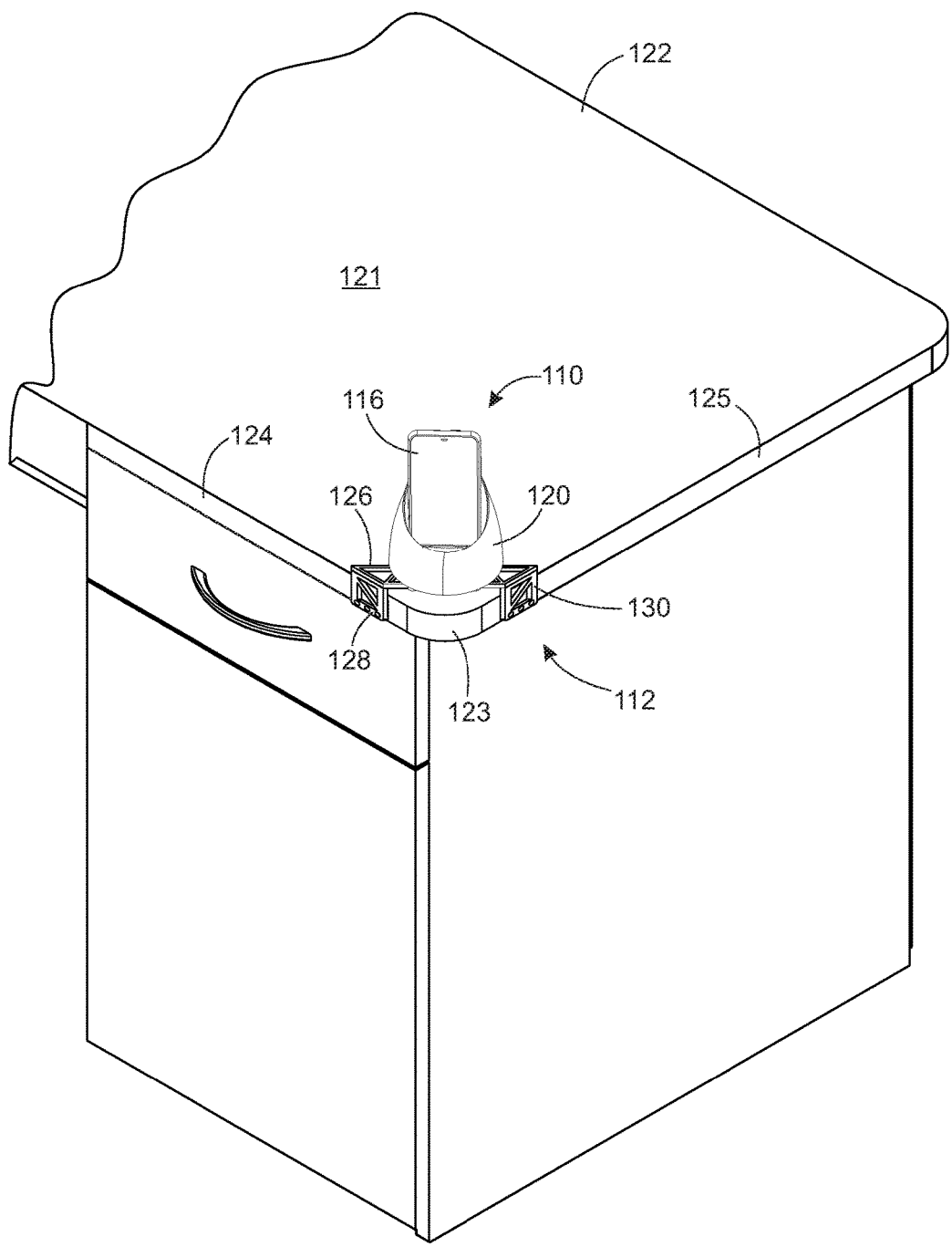
FIG. 1 shows a top perspective view of a mobile computing device holder coupled to a piece of furniture.
Figure 2:
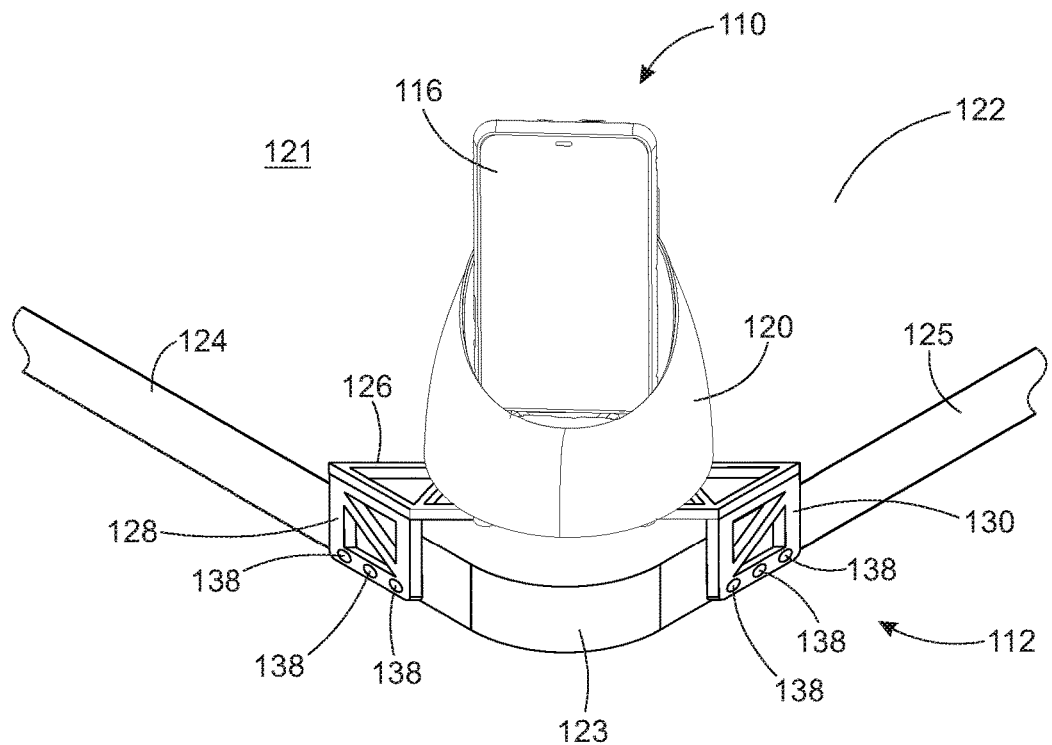
FIG. 2 shows a close up view of the mobile computing device holder of FIG. 1.
Figure 3:
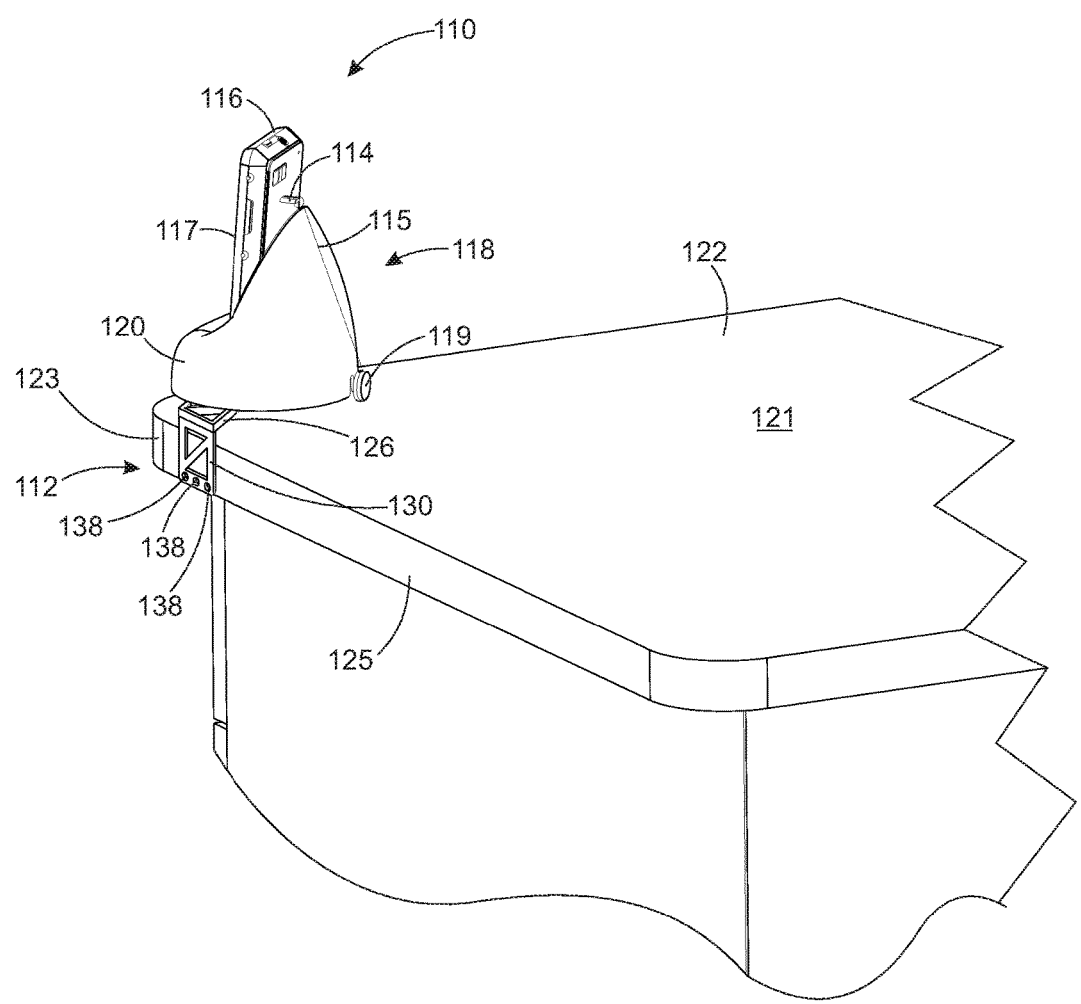
FIG. 3 shows a rear perspective view of the mobile computing device holder of FIG. 1.
Figure 4:
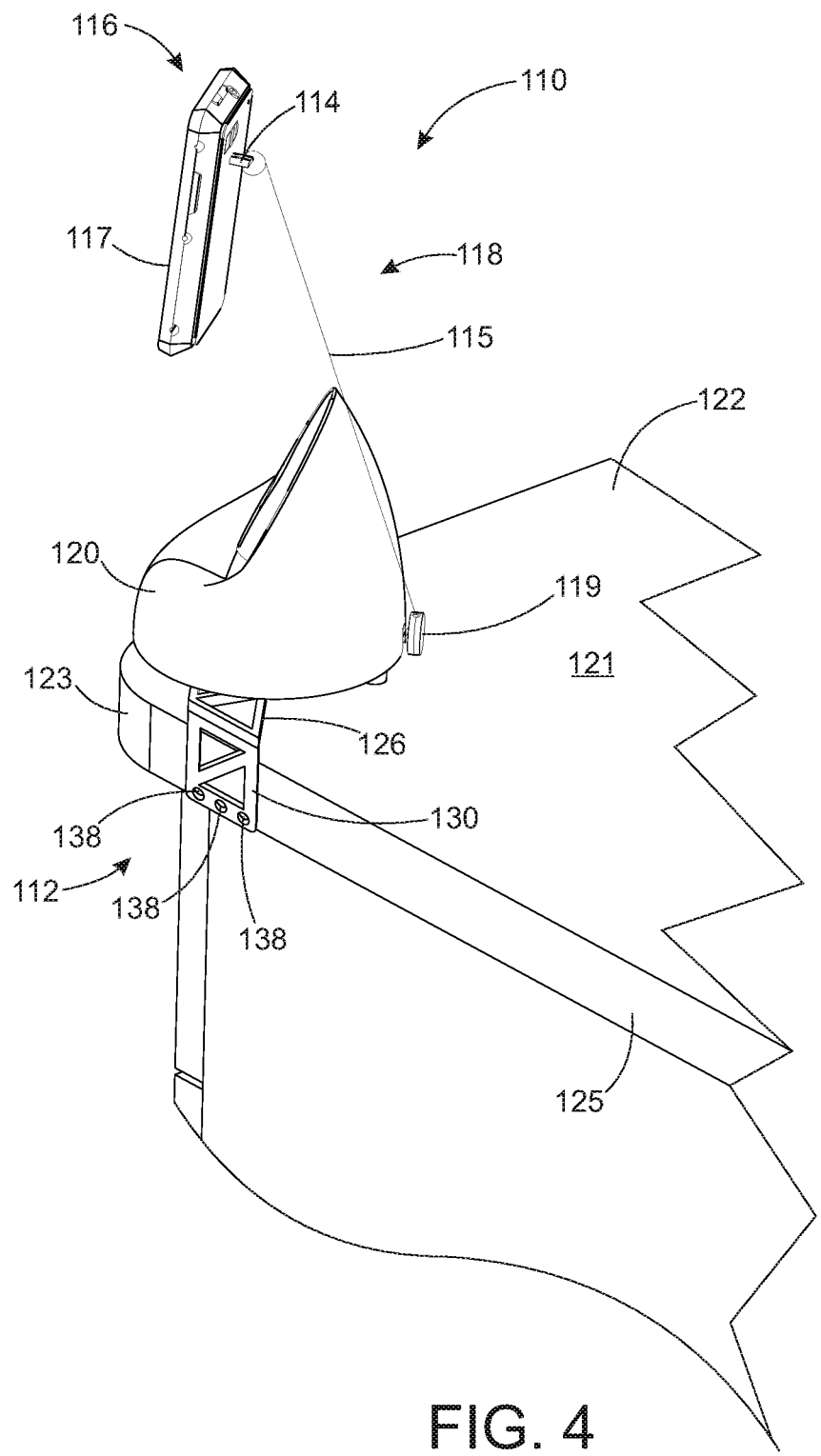
FIG. 4 shows a rear perspective view of the mobile computing device holder of FIG. 1 with the mobile computing device removed from the mobile computing device base.

FIG. 1 through FIG. 5 shows an embodiment of a mobile computing device holder 110. Mobile computing device holder 110 includes a corner mount fixture 112, a mobile computing device base 120 coupled to corner mount fixture 112, a coupling apparatus 114 (FIG. 3 and FIG. 4), and a tether apparatus 118 (FIG. 3 and FIG. 4). Corner mount fixture 112 couples mobile computing device holder 110 to a piece of furniture 122, as shown in FIG. 1 through FIG. 4. Mobile computing device base 120 is coupled to corner mount fixture 112. Mobile computing device 116 is held by mobile computing device base 120. Coupling apparatus 114 (FIG. 3 and FIG. 4) is coupled to mobile computing device 116. Tether device 118 is coupled to both coupling apparatus 114 and mobile computing device base 120, and couples coupling apparatus 114 to mobile computing device base 120 such that mobile computing device 116 is tethered to mobile computing device base 120 and piece of furniture 122.

Figure 5:
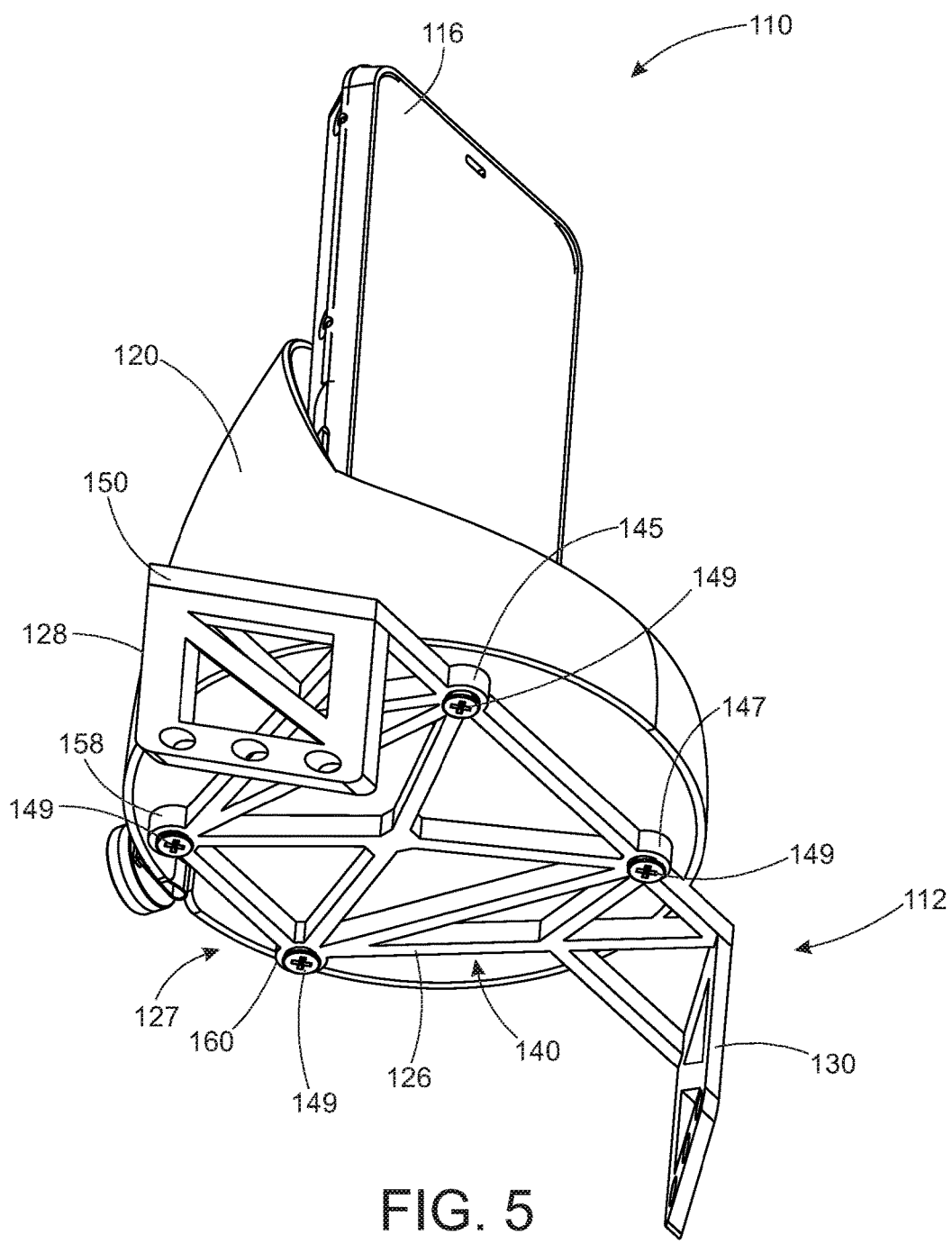
FIG. 5 shows a bottom perspective view the mobile computing device holder of FIG. 1.

Mobile computing device holder 110 includes mobile computing device base 120 and mobile computing device 116. FIG. 1 shows a top perspective view of mobile computing device holder 110 supporting mobile computing device base 120 and mobile computing device 116, with mobile computing device holder 110 coupled to a piece of furniture 122. FIG. 2 shows a close-up view of mobile computing device holder 110 coupled to a corner 123 of a desk 122. FIG. 3 shows a rear perspective view of mobile computing device holder 110 supporting mobile computing device base 120 and mobile computing device 116. FIG. 4 shows a rear perspective view of mobile computing device holder 110 with mobile computing device 116 removed from mobile computing device base 120. FIG. 5 shows a bottom perspective view of mobile computing device holder 110 un-coupled from piece of furniture 122, with mobile computing device holder 110 supporting mobile computing device base 120 and mobile computing device 116.

Mobile computing device holder 110 holds mobile computing device base 120 such that mobile computing device 116 is easily accessed. Mobile computing device 116 is cradled in mobile computing device base 120. Mobile computing device holder 110 holds mobile computing device 116 so that mobile computing device 116 can be easily picked up and used, but mobile computing device 116 cannot be moved far from mobile computing device base 120. Mobile computing device 116 can be any type of electronic computing device such as a cellular telephone, an electronic scanner, a digital camera, a portable computer, a global positioning system device, or any other electronic device that is portable. Mobile computing device 116 is often used in retail stores for performing tasks. In some situations, it is desirable to tie down mobile computing device 116 so that mobile computing device 116 cannot be removed from a particular location. Mobile computing device holder 110 tethers mobile computing device 116 to mobile computing device base 120 and piece of furniture 122, so that mobile computing device 116 is available for use by individuals, but mobile computing device 116 cannot be lost or stolen. Mobile computing device base 120 holds mobile computing device 116. Mobile computing device base 120 can be a charger for mobile computing device 116, a docking station, a base station, or a different type of holder for mobile computing device 116.

Mobile computing device holder 110 includes corner mount fixture 112. Corner mount fixture 112 supports mobile computing device base 120 and mobile computing device 116 so that it is convenient and easy to remove mobile computing device 116 from mobile computing device base 120 so that mobile computing device 116 can be used. Corner mount fixture 112 holds mobile computing device base 120 on a piece of furniture 122 as shown in FIG. 1 through FIG. 4. In this embodiment, corner mount fixture 112 is the means to hold mobile computing device base 120, and a means to couple mobile computing device 116 to corner 123 of piece of furniture 122. Mobile computing device base 120 cradles mobile computing device 116. In this embodiment, corner mount fixture 112 removeably couples mobile computing device base 120 to corner 123 of piece of furniture 122.

Mobile computing device 110 also includes coupling apparatus 114 coupled to mobile computing device 116, see FIG. 3, FIG. 4, FIG. 14 and FIG. 15. In this embodiment, coupling apparatus 114 is coupled to a rear surface 199 (see FIG. 14) of mobile computing device 116.

Mobile computing device holder 110 includes tether device 118 (FIG. 3 and FIG. 4) that couples to both mobile computing device base 120 and coupling apparatus 114. Tether device 118 tethers mobile computing device 116 to mobile computing device base 120 so that mobile computing device 116 is prevented from moving too far from corner mount fixture 112. In this embodiment, tether device 118 is the means to couple mobile computing device 116 to mobile computing device base 120. In some embodiments, tether device 118 couples coupling apparatus 114 and mobile computing device 116 to corner mount fixture 112.

Figure 6:
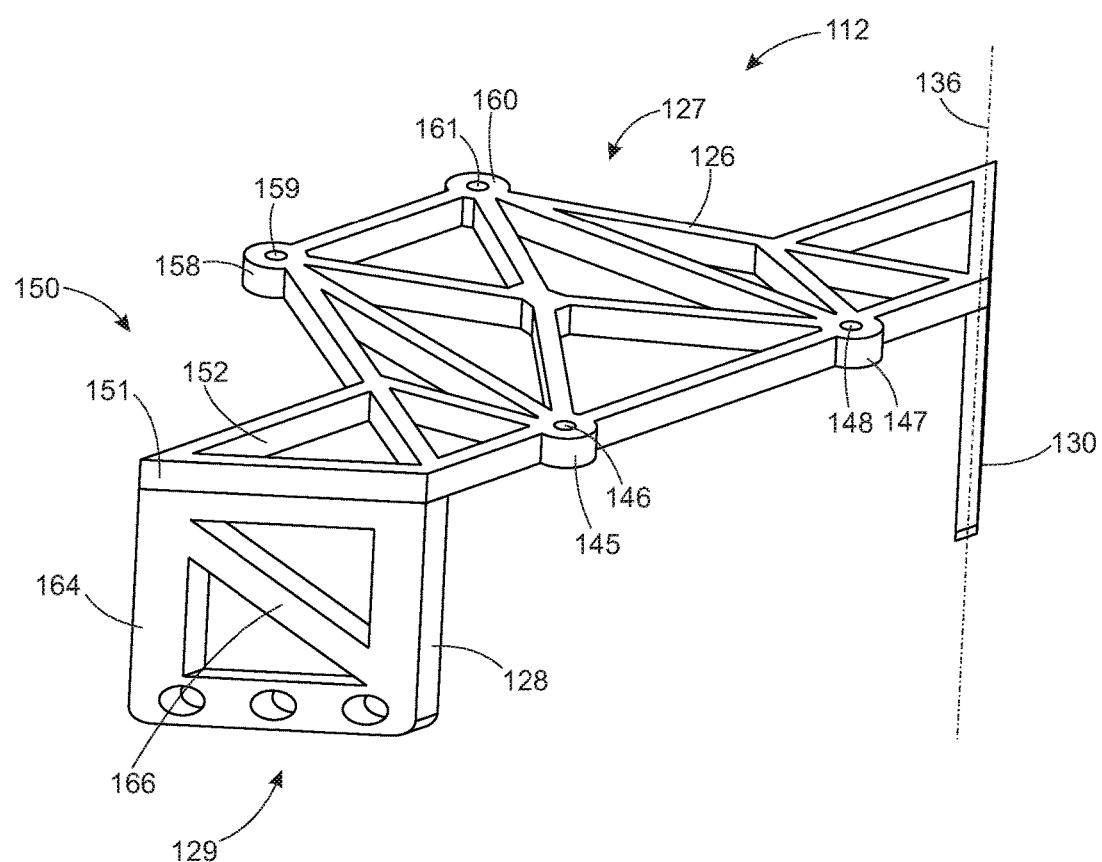
FIG. 6 shows a front perspective view of a corner mount fixture.
Figure 7:
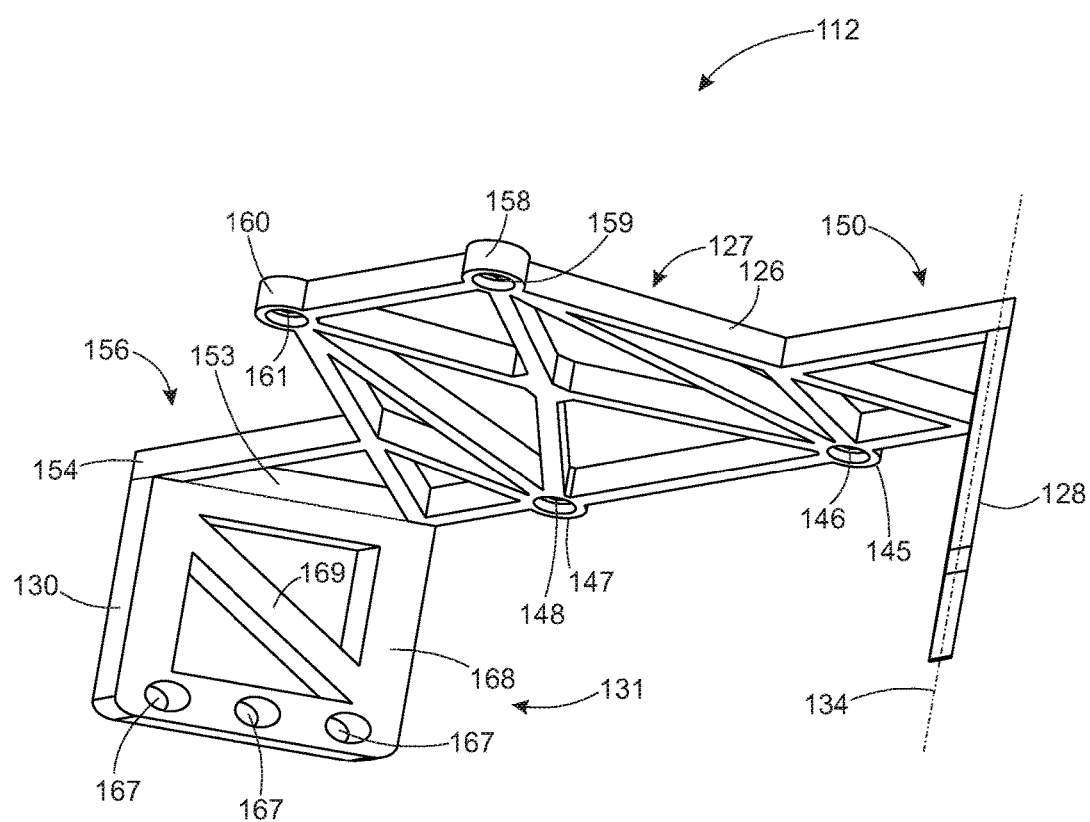
FIG. 7 shows a bottom perspective view of the corner mount fixture of FIG. 6.
Figure 8:
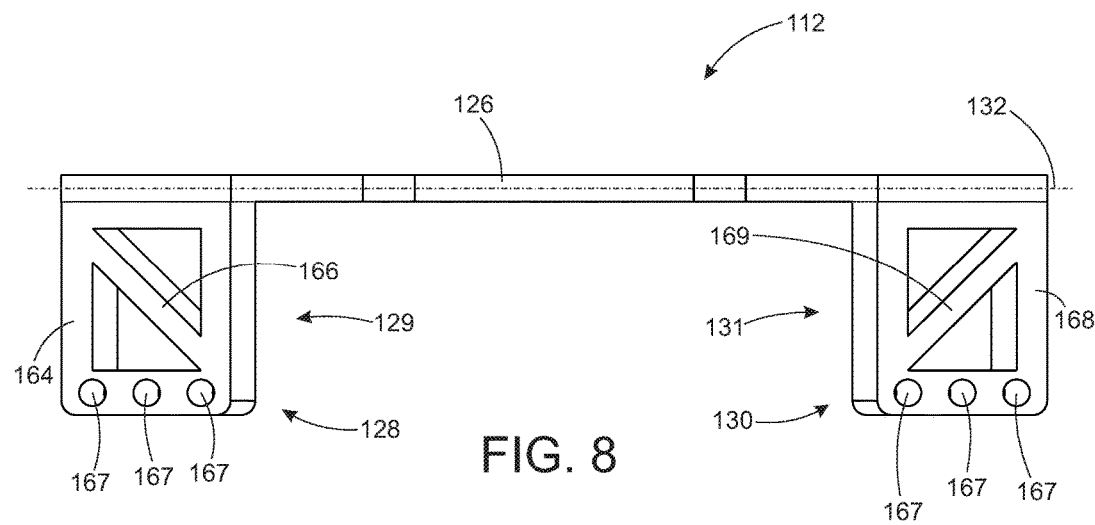
FIG. 8 shows a front view of the corner mount fixture of FIG. 6.
Figure 9:
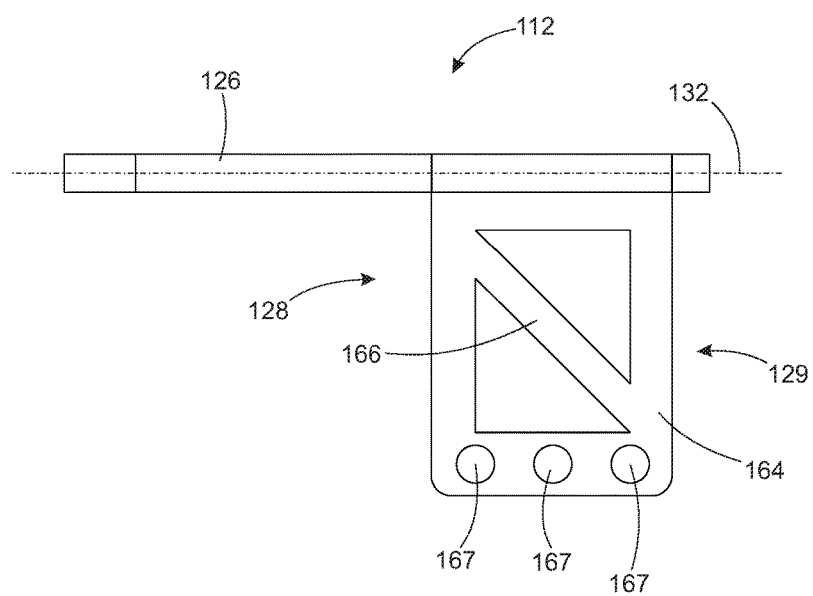
FIG. 9 shows a side view of the corner mount fixture of FIG. 6.
Figure 10:
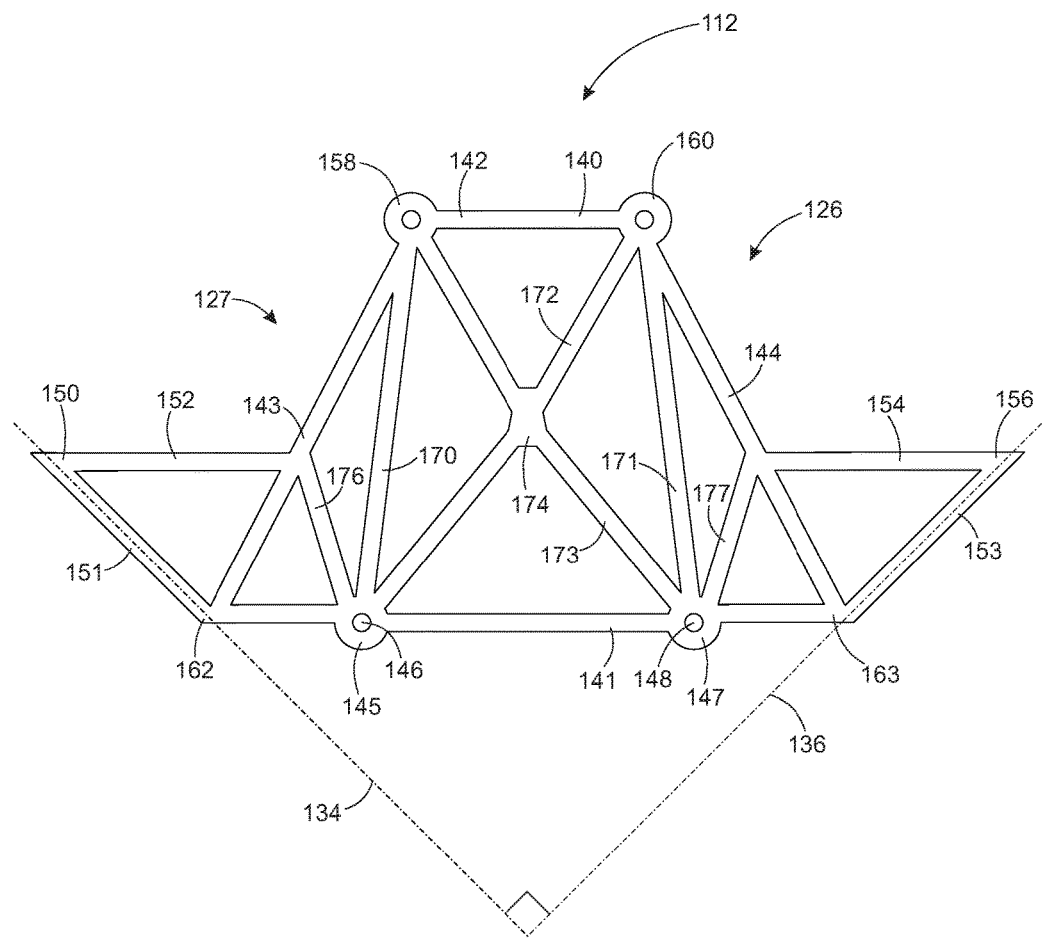
FIG. 10 shows a top view of the corner mount fixture of FIG. 6.
Figure 11:
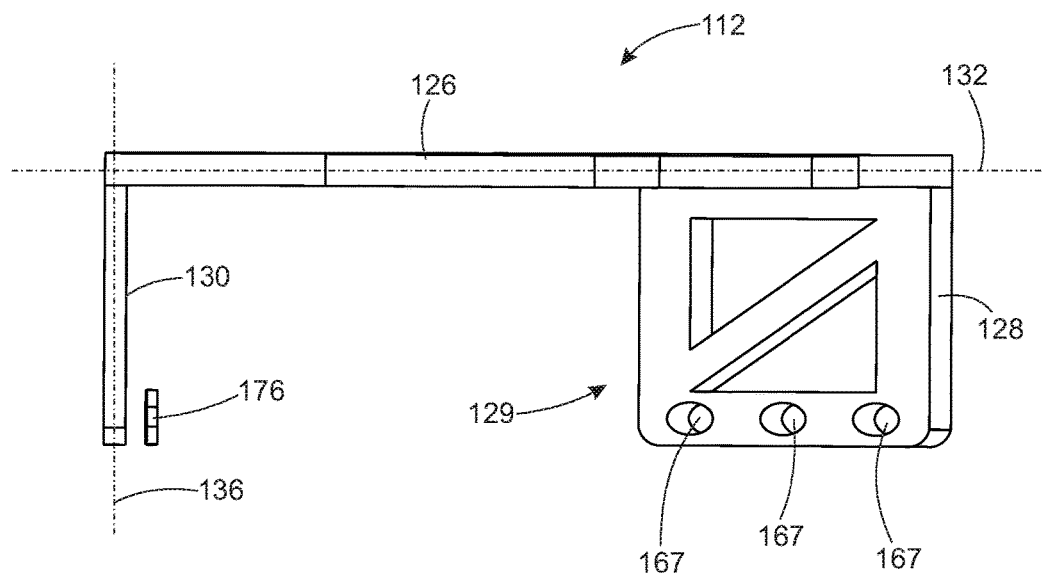
FIG. 11 shows a rear view along a side coupler plane of the corner mount fixture of FIG. 6.
Figure 12:
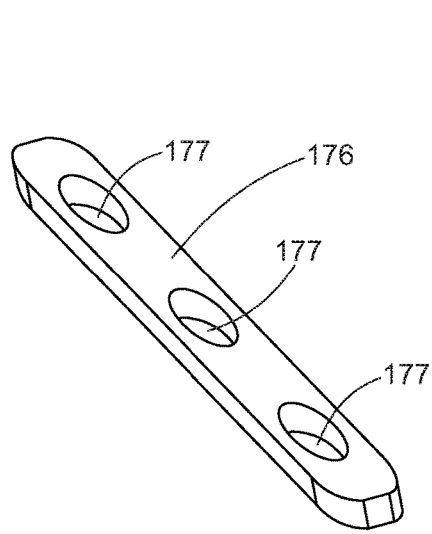
FIG. 12 shows a perspective view of a shim.
Figure 13:
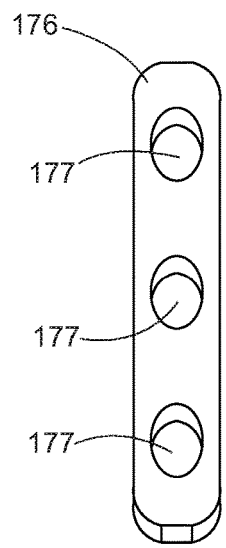
FIG. 13 shows a front view of a shim.

FIG. 6 through FIG. 13 show details of corner mount fixture 112. FIG. 6 shows a front perspective view of corner mount fixture 112. FIG. 7 shows a bottom perspective view of corner mount fixture 112. FIG. 8 shows a front view of corner mount fixture 112. FIG. 9 shows a side view of corner mount fixture 112. FIG. 10 shows a top view of corner mount fixture 112. FIG. 11 shows a rear view looking down a plane 136 of corner mount fixture 112. FIG. 12 shows a perspective view of a shim 176. FIG. 13 shows a front view of shim 176.

Corner mount fixture 112 couples mobile computing device base 120 to a piece of furniture. In the embodiment shown, the piece of furniture is piece of furniture 122, which is a desk, but this is not meant to be limiting. Corner mount fixture 112 can couple to a corner of many different types of furniture.

Corner mount fixture 112 couples mobile computing device base 120 to a corner 123 of piece of furniture 122. Corner mount fixture 112 couples mobile computing device base 120 to piece of furniture 122 so that mobile computing device base 120 is in a convenient location for holding mobile computing device 116. In the embodiment shown, corner mount fixture 112 removeably couples mobile computing device base 120 to piece of furniture 122, but this is not meant to be limiting. In some embodiments, corner mount fixture 112 non-removeably couples mobile computing device base 120 to piece of furniture 122.

Corner mount fixture 112 includes a base bracket 126, a first side coupler 128, and a second side coupler 130. Mobile computing device base 120 is coupled to base bracket 126, as best seen in FIG. 5. First side coupler 128 is coupled to base bracket 126 such that first side coupler 128 is perpendicular to base bracket 126. Second side coupler 130 is coupled to base bracket 126 such that second side coupler 130 is perpendicular to base bracket 126. First side coupler 128 is also perpendicular to second side coupler 130, see FIG. 10.

Once mobile computing device base 120 is coupled to base bracket 126, corner mount bracket 112 is coupled to corner 123 of piece of furniture 122, as shown in FIG. 1 through FIG. 4. In this embodiment, piece of furniture 122 is a desk, but this is not meant to be limiting. Corner mount fixture 112 can be coupled to a corner of many different types of furniture. In the embodiment shown in the figures, corner mount fixture 112 is coupled to corner 123 by coupling first side coupler 128 to a first side 124 of piece of furniture 122, and coupling second side coupler 130 to a second side 125 of piece of furniture 122, as shown in FIG. 1. Base bracket 126 sits on a top surface 121 of piece of furniture 122 in response to first side coupler 128 being coupled to first side 124 of piece of furniture 122, and second side coupler 130 being coupled to second side 125 of piece of furniture 122. First and second side couplers 128 and 130 are coupled to first and second side 124 and 125 using screws 138 (FIG. 2, FIG. 3 and FIG. 4) that extend through screw holes 167 (FIG. 7 and FIG. 11) in first and second side couplers 128 and 130. In some embodiments, shims 176 are used between first or second side coupler 128 or 130 and piece of furniture 122 to snugly fit corner mount fixture 112 to corner 123. Shims 176 are shown in FIG. 11, FIG. 12, and FIG. 13. Shims 176, when used, fit between holes 167 of first or second side coupler 128 and 130, and piece of furniture 122. Shims 176 can fill in gaps and ensure a secure coupling between corner mount fixture 112 and piece of furniture 122. One or more shims 176 can be used as needed. Each shim 176 includes one or more holes 177, as shown in FIG. 12 and FIG. 13. In the embodiment shown, each shim 176 includes three holes 177, that match up with the three holes 167 in each of first side coupler 128 and second side coupler 130. Each screw 138 will extend through a hole 167, then a hole 177 in shim 176, in order to couple corner mount bracket 112 to piece of furniture 122.

First and second side couplers 128 and 130 are coupled to first and second side 124 and 125 such that base bracket 126 sits on top surface 121, and corner 123 extends from between first side coupler 128 and second side coupler 130, as shown in FIG. 1, FIG. 2, FIG. 3, and FIG. 4.

Base bracket 126 is formed of a lattice of rods 127, as can be seen in FIG. 5, FIG. 6, FIG. 7, and FIG. 10. In this embodiment, base bracket 126 is formed of a lattice of rectangular rods 127, meaning each individual rod of lattice of rods 127 has a rectangular cross-section, but this is not meant to be limiting. Each rod of lattice of rods 127 can have any number of cross-sectional shapes, including but not limited to round, oval, or polygonal. Base bracket 126 is in the shape of a polygon, best seen in FIG. 10. In this embodiment, base bracket 126 is in the shape of an eight-sided polygon, lying in a plane 132, as shown in FIG. 10 and FIG. 11.

First side coupler 128 is formed of a lattice of rods 129, as shown in FIG. 6, and FIG. 11. In this embodiment, first side coupler 128 is formed of a lattice of rectangular rods 129, meaning each rod of lattice of rods 129 has a rectangular cross-section, but this is not meant to be limiting. Each rod of lattice of rods 129 can have any number of cross-sectional shapes, including but not limited to round, oval, or polygonal. First side coupler 128 is rectangular shaped, and formed of a first side coupler rectangular boundary frame 164, and a first side coupler diagonal rod 166, as shown in FIG. 6. First side coupler diagonal rod 166 acts as a brace and helps make first side coupler 128 sturdy. First side coupler 128, including lattice of rods 129, lie in a plane 134 (FIG. 7 and FIG. 10). First side coupler plane 134 is perpendicular to base bracket plane 132 (FIG. 10).

Second side coupler 130 is formed of a lattice of rods 131, as shown in FIG. 7. In this embodiment, second side coupler 130 is formed of a lattice of rectangular rods 131, meaning each individual rod of lattice of rods 131 has a rectangular cross-section, but this is not meant to be limiting. Each rod of lattice of rods 131 can have any number of cross-sectional shapes, including but not limited to round, oval, or polygonal. Second side coupler 130 is rectangular shaped, and formed of a second side coupler rectangular boundary frame 168, and a second side coupler diagonal rod 169 (FIG. 7). Second side coupler diagonal rod 169 acts as a brace and helps make second side coupler 130 sturdy. Second side coupler 130, including lattice of rods 131, lie in a second side coupler plane 136 (FIG. 6 and FIG. 11). Second side coupler plane 136 is perpendicular to base bracket plane 132 (FIG. 11). Second side coupler plane 136 is also perpendicular to first side coupler plane 134, see FIG. 10.

Base bracket 126 is the means to hold mobile computing device base 120 in this embodiment, and first and second side couplers 128 and 130 are the means to couple base bracket 126 to corner 123 of piece of furniture 122. Base bracket 126 in this embodiment is a means to support mobile computing device base 120 and mobile computing device 116. In this embodiment, first and second side couplers 128 and 130 are a means to removeably couple the means to hold the mobile computing device base 120 to corner 123 of piece of furniture 122.

Base bracket 126 includes several different portions. Base bracket 126 is in the shape of an eight-sided polygon lying in plane 132, as shown in FIG. 10, and FIG. 11. Base bracket 126 includes a base mount 140, a first side wing 150, and a second side wing 156, as shown in FIG. 10. Base mount 140 is the portion of base bracket 126 that is coupled to mobile computing device base 120 (FIG. 5). First side wing 150 is coupled to first side coupler 128 (FIG. 5 and FIG. 6). Second side wing 156 is coupled to second side coupler 130 (FIG. 7).

Referring to FIG. 10, base mount 140 is a quadrilateral, in this embodiment in the shape of a trapezoid, and is bounded by a base mount front rod 141, a base mount rear rod 142, a base mount first side rod 143, and a base mount second side rod 144. Base mount front rod 141 extends from a base mount first front corner 162 to a base mount second front corner 163, as can be seen in FIG. 10. Base mount front rod 141 includes a first screw node 145 and a second screw node 147. Screw nodes are nodes with holes for receiving screws to attach base bracket 126 to mobile computing device holder 120. First screw node 145 includes a first screw hole 146, and second screw node 147 includes a second screw hole 148, as shown in FIG. 7 and FIG. 10. Each of screw holes 146 and 148 receive a screw 149 that attaches base bracket 126 to mobile computing device holder 120, as shown in FIG. 5. Each of screw nodes 145 and 147 are between base mount first front corner 162 and base mount second front corner 163, as shown in FIG. 10.

Base mount rear rod 142 extends from a third screw node 158 to a fourth screw node 160, as can be seen in FIG. 10. Third screw node 158 includes a third screw hole 159, and fourth screw node 160 includes a fourth screw hole 161, as shown in FIG. 6 and FIG. 7. Each of screw holes 159 and 161 receive a screw 149 that attaches base bracket 126 to mobile computing device holder 120, as shown in FIG. 5.

Screw nodes 158 and 160 are at opposing ends of base mount rear rod 142, as shown in FIG. 10.

Base mount first side rod 143 extends from base mount first front corner 162 to third screw node 158, and base mount second side rod 144 extends from base mount second front corner 163 to fourth screw node 160. Base mount 140 is in the shape of a trapezoid in this embodiment, but this is not meant to be limiting. In some embodiments, base mount 140 has other shapes.

Base mount 140 also includes a number of brace rods that act to strengthen base mount 140 and base bracket 126. Base mount 140 includes a first brace rod 170, a second brace rod 171, a third brace rod 172, a fourth brace rod 173, a fifth brace rod 176 and a sixth brace rod 177. First brace rod 170 extends between first screw node 145 and third screw node 158. Second brace rod 171 extends between second screw node 147 and fourth screw node 160. Third brace rod 172 extends between first screw node 145 and fourth screw node 160. Fourth brace rod 173 extends between second screw node 147 and third screw node 158. Third brace rod 172 and fourth brace rod 173 cross at a junction 174.

Base bracket 126 also includes first side wing 150 and second side wing 156, as shown in FIG. 6, FIG. 7, and FIG. 10. First side wing 150 is coupled to base mount first side rod 143, see FIG. 10. Second side wing 156 is coupled to base mount second side rod 144.

First side wing 150 includes a first side wing front rod 151, and a first side wing rear rod 152, as shown in FIG. 6 and FIG. 10. First side coupler 128 is coupled to first side wing front rod 151, as shown in FIG. 6. Second side wing 156 includes a second side wing front rod 153, and a second side wing rear rod 154, as shown in FIG. 7 and FIG. 10. Second side coupler 130 is coupled to second side wing front rod 153, as shown in FIG. 7.

Once mobile computing device base 120 is coupled to base bracket 126 as shown in FIG. 5, and corner bracket 112 is coupled to corner 123 of piece of furniture 122 as shown in FIG. 1 through FIG. 4, mobile computing device base 120 is coupled to piece of furniture 122, and can be used to hold mobile computing device 116. Mobile computing device 116 is stored in a convenient and accessible location in mobile computing device base 120. Corner mount fixture 112 holds mobile computing device base 120 securely and provides a fixed and stable location for mobile computing device 116 to be stored.

Figure 14:
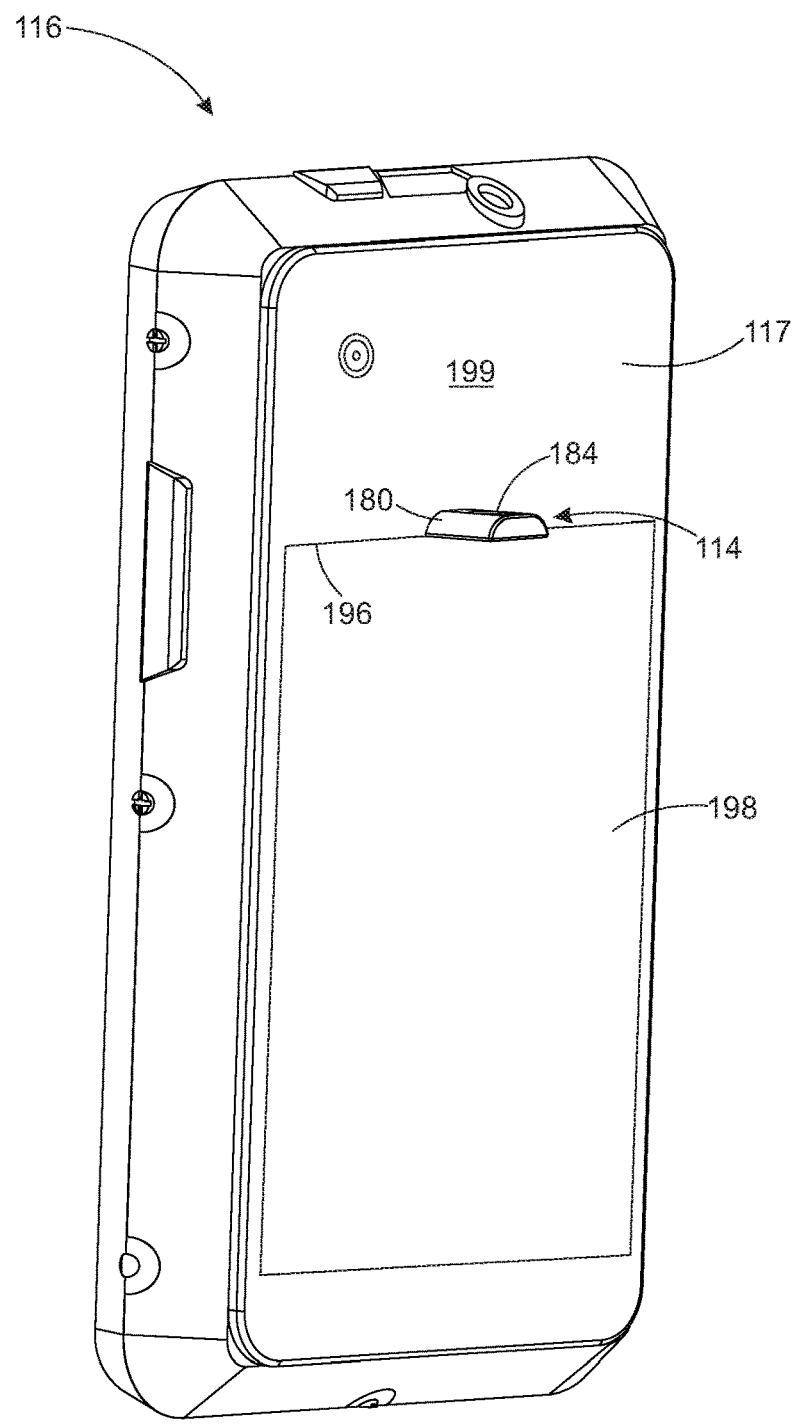
FIG. 14 shows a rear perspective view of a coupling apparatus coupled to a mobile computing device.
Figure 15:
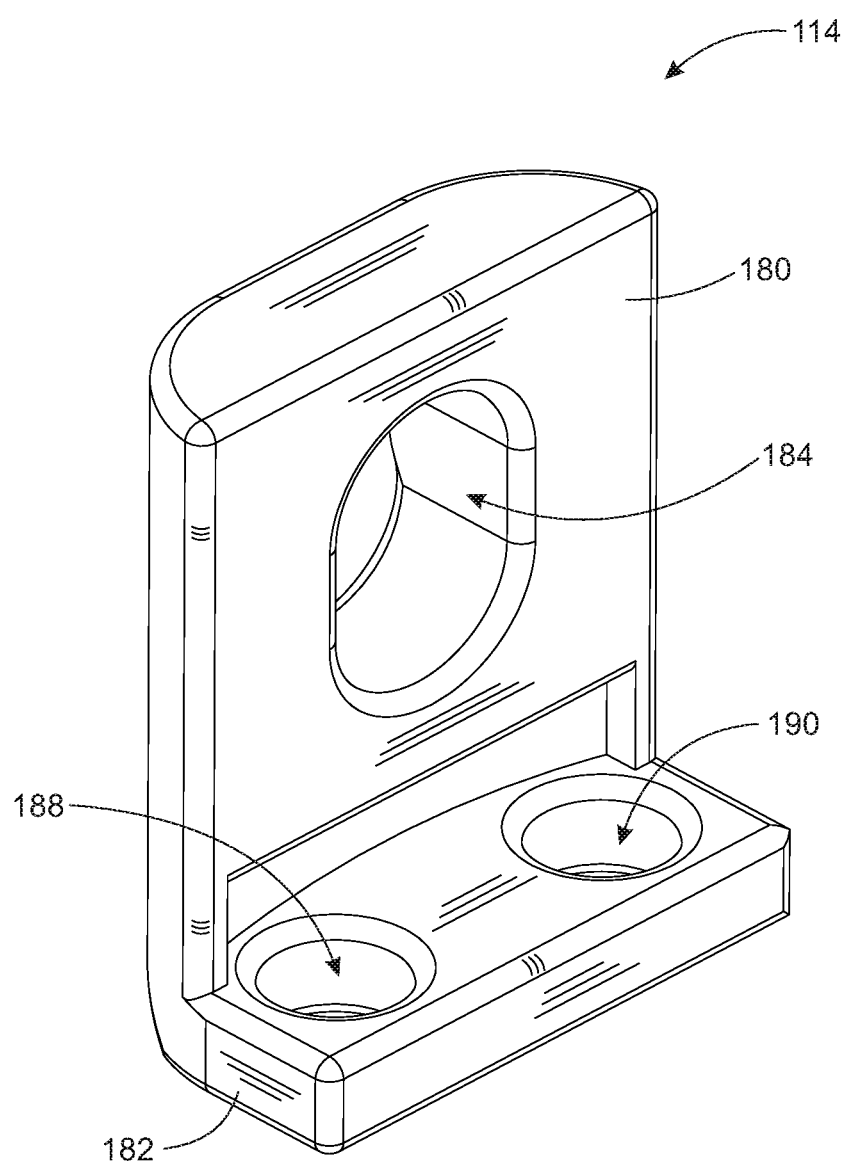
FIG. 15 shows a front perspective view of a coupling apparatus.

FIG. 14 and FIG. 15 show details of coupling apparatus 114. Coupling apparatus 114 is used to couple mobile computing device 116 to mobile computing device base 120 so that mobile computing device 116 can be used, but not taken too far, lost, or stolen. Coupling apparatus 114 is coupled to tether device 118 as shown in FIG. 3 and FIG. 4 to tether mobile computing device 116 to mobile computing device base 120. FIG. 14 shows an embodiment of coupling apparatus 114 coupled to mobile computing device 116. FIG. 15 shows a front perspective view of coupling apparatus 114.

Coupling apparatus 114 includes a loop plate 180 and a coupler plate 182, as shown in FIG. 15. Loop plate 180 includes a hole 184 through loop plate 180. Hole 184 is coupled to a cord 115 of tether device 118, as best seen in FIG. 4. In this embodiment, hole 184 is oval shaped, but this is not meant to be limiting. Hole 184 can be round shaped, rectangular shaped, or any other shape that is desirable for coupling purposes. In this embodiment, loop plate 180 has rounded edges, but this is not meant to be limiting. In some embodiments, loop plate 180 does not have rounded edges.

Loop plate 180 extends from mobile computing device 116 in response to coupling apparatus 114 being coupled to mobile computing device 116, as shown in FIG. 3, FIG. 4, and FIG. 14. In this embodiment, loop plate 180 extends approximately perpendicularly to a rear surface 199 of a housing 117 of mobile computing device 116, as can be seen in FIG. 14. In some embodiments, however, loop plate 180 extends at an angle other than 90 degrees from housing 117.

In the embodiment showing the figures, coupling apparatus 114 is coupled to the inside of a battery compartment of mobile computing device 116. In this embodiment, loop plate 180 extends from mobile computing device 116 in response to coupler plate 182 of coupling apparatus 180 being coupled to the battery compartment. Coupler plate 182 of coupling apparatus 114 is coupled to the battery compartment such that loop plate 180 extends from housing 117 of mobile computing device 116 through a seam 196 between housing 117 of mobile computing device 116 and a battery compartment lid 198, as shown in FIG. 14. Coupler plate 182 of coupling apparatus 114 is coupled to the battery compartment, and then battery compartment lid 198 is installed such that loop plate 180 extends from seam 196. A beveled edge on loop plate 180 helps loop plate 180 fit through seam 196 and helps battery compartment lid 198 fit securely once coupling apparatus 114 is attached to mobile computing device 114. It is to be understood that coupling apparatus 114 can be coupled to mobile computing device 116 in many different ways and positions on mobile computing device 116, and that the coupling location and method shown is not meant to be limiting.

Coupler plate 182 is coupled to loop plate 180. Coupler plate 182 is configured to be coupled to mobile computing device 116. In this embodiment, coupler plate 182 is detachably coupled to mobile computing device 116, but this is not meant to be limiting. Coupler plate 182 can be configured to be coupled to mobile computing device in many different ways. In some embodiments, coupler plate 182 includes at least one screw hole, and coupler plate 182 is coupled to mobile computing device 116 by extending a screw through the at least one screw hole and into housing 117 of mobile computing device 116.

In the embodiment shown, coupler plate 182 is configured to be coupled to mobile computing device 116 using a first and a second screw hole 188 and 190 in coupler plate 180, as shown in FIG. 15. Screws extends through first screw hole 188 and second screw hole 190 into housing 117 of mobile computing device 116. In this embodiment, the screws are coupled to an edge of the battery compartment of housing 117, so that loop plate 180 extends through seam 196 once battery compartment lid 198 is coupled to housing 117, as shown in FIG. 14. In some embodiments, coupler plate 182 is configured to be coupled to mobile computing device 116 using other coupling means, and/or in other locations on mobile computing device 116.

In the embodiment shown, coupler plate 182 is coupled to loop plate 180 such that coupler plate 182 is perpendicular to loop plate 180.

Coupling apparatus 114 and mobile computing device base 120 are coupled together using tether device 118, as shown in FIG. 3 and FIG. 4. Tether device 118 tethers mobile computing device 116 to mobile computing device base 120. Tether device 118 is coupled to mobile computing device base 120, and tether device 118 is coupled to coupling apparatus 114, which is coupled to mobile computing device 116. In this embodiment, tether device 118 is retractable, but this is not meant to be limiting. In some embodiments, tether device 118 is not retractable. In some embodiments tether device 118 is a cord or a string or a wire or a strap. In some embodiments, tether device 118 is coupled to corner mount fixture 112 instead of mobile computing device base 120, which tethers mobile computing device 116 to corner mount fixture 112.

Tether device 118, in the embodiments shown in the figures, includes a cord 115 that is coupled to coupling apparatus 114, and a reel 119 that is coupled to mobile computing device base 120 (FIG. 3 and FIG. 4). Cord 115 winds onto reel 119 so that mobile computing device 116 can be removed from mobile computing device base 120 and used, but mobile computing device 116 cannot be moved any further from corner mount fixture 112 than the length of cord 115. In this embodiment, cord 115 retracts onto reel 119 so that cord 115 is kept neat and does not get tangled. Tether device 118 prevents loss or theft of mobile computing device 116, for example.

Corner mount fixture 112 supports mobile computing device base 120 and mobile computing device 116 on piece of furniture 122. Coupling apparatus 114 couples mobile computing device 116 to tether 118. Tether 118 couples coupling apparatus 114 and mobile computing device 116 to mobile computing device base 120. Thus, mobile computing device holder 110 holds mobile computing device base 120 and mobile computing device 116, and keeps mobile computing device 116 from being removed farther than the length of cord 115 from corner mount fixture 112.

Figure 16:
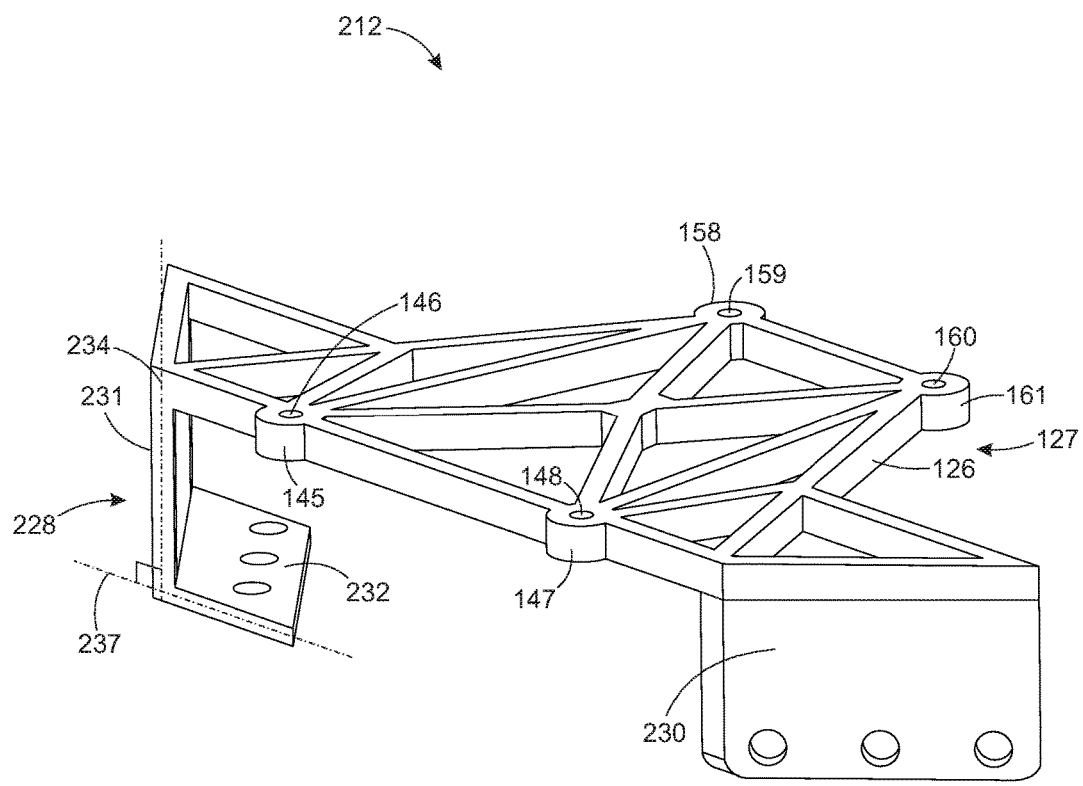
FIG. 16 shows a front perspective view of a further embodiment of a corner mount fixture.

FIG. 16 illustrates an embodiment of a corner mount fixture 212 that can be used in place of corner mount fixture 112. Corner mount fixture 212 is the same as corner mount fixture 112 except first side coupler 128 is replaced with first side coupler 228, and second side coupler 130 is replaced with second side coupler 230.

Second side coupler 230 is the same as first side coupler 128 except that second side coupler 230 is a solid piece of material instead of being formed of a lattice of rods.

First side coupler 228 is a solid piece of material formed of two perpendicular plates, first side coupler first plate 231 and first side coupler second plate 232, as shown in FIG. 16. First side coupler first plate 231 lies in first side coupler plane 234 and is coupled to base bracket 126. First side coupler second plate 232 is coupled to first side coupler second plate 231. First side coupler second plate 232 is perpendicular to first side coupler first plate 231. First side coupler second plate 232 lies in a first side coupler second plate plane 237 that is perpendicular to first side coupler plane 234. First side coupler 228 is formed of two perpendicular plates 231 and 232 so that first side coupler 228 can wrap around the edge of a desk that corner mount 212 is being coupled to. First side coupler first plate 231 and first side coupler second plate 232 help to couple corner mount fixture 212 more firmly to a desk.

Figure 17:
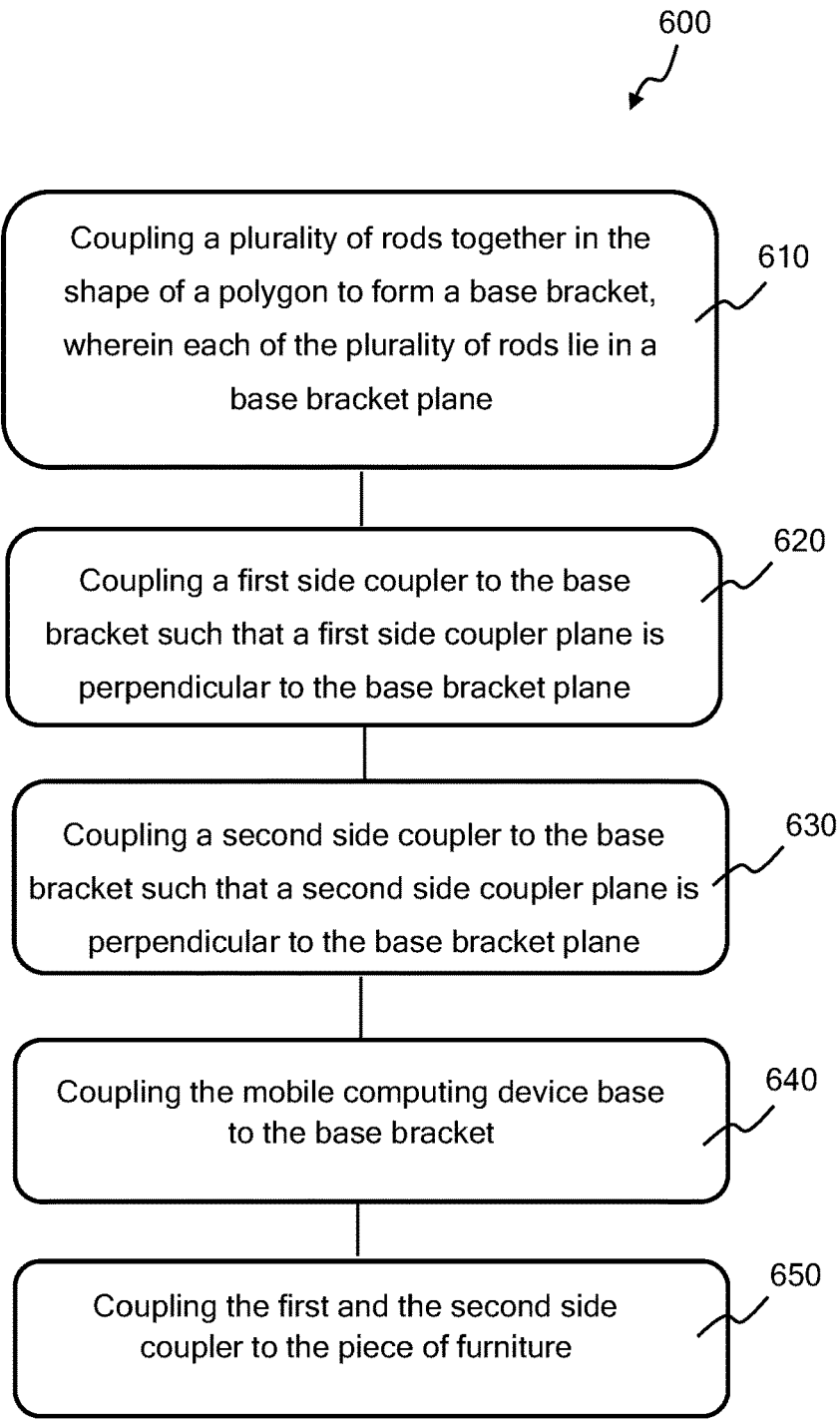
FIG. 17 illustrates a method of mounting a mobile computing device base to a piece of furniture.

FIG. 17 illustrates a method 600 of mounting a mobile computing device base to a piece of furniture. Method 600 includes an act 610 of coupling a plurality of rods together in the shape of a polygon to form a base bracket, where each of the plurality of rods lie in a base bracket plane. In some embodiments, the base bracket is in the shape of an eight-sided polygon.

Method 600 includes an act 620 of coupling a first side coupler to the base bracket such that a first side coupler plane is perpendicular to the base bracket plane, and an act 630 of coupling a second side coupler to the base bracket such that a second side coupler plane is perpendicular to the base bracket plane. In some embodiments, the first side coupler is perpendicular to the second side coupler.

Method 600 also includes an act 640 of coupling the mobile computing device base to the base bracket, and an act 650 of coupling the first and the second side coupler to the piece of furniture. The first and the second side couplers couple the base bracket and the mobile computing device base to the piece of furniture. In some embodiments, coupling the first and the second side coupler to the piece of furniture includes coupling the first and the second side coupler to the piece of furniture such that a corner of the piece of furniture extends out between the first and the second side coupler. In some embodiments, coupling the first and the second side coupler to the piece of furniture includes coupling the first side coupler to a first side of the piece of furniture. In some embodiments, coupling the first and the second side coupler to the piece of furniture includes and coupling the second side coupler to a second side of the piece of furniture.

The base bracket sits on a top surface of the piece of furniture in response to coupling the first and the second side coupler to the piece of furniture.

Method 600 can include many other acts. In some embodiments, method 600 includes forming the first side coupler using a first rectangular lattice of rods. In some embodiments, method 600 includes forming the second side coupler comprising a second rectangular lattice of rods.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A mobile computing device holder comprising:
    a corner mount fixture, wherein the corner mount fixture removeably couples to a piece of furniture, and wherein the corner mount fixture comprises:
        a base bracket, wherein the base bracket is in the shape of an eight-sided polygon;
        a first side coupler coupled to the base bracket, wherein the first side coupler is perpendicular to the base bracket; and
        a second side coupler coupled to the base bracket, wherein the second side coupler is perpendicular to the base bracket;
        wherein the first and the second side coupler couple the corner mount fixture to the piece of furniture;
    a mobile computing device base coupled to the corner mount fixture, wherein the mobile computing device base is configured to cradle a mobile computing device;
    a coupling apparatus coupled to the mobile computing device; and
    a tether device coupled to both the mobile computing device base and the coupling apparatus, wherein the tether device couples the coupling apparatus to the mobile computing device base.

2. The mobile computing device holder of claim 1, wherein the base bracket sits on a top surface of the piece of furniture with a corner of the piece of furniture extending from between the first side coupler and the second side coupler in response to the first side coupler being coupled to a first side of the piece of furniture and the second side coupler being coupled to a second side of the piece of furniture.

3. The mobile computing device holder of claim 1, wherein the base bracket is formed of a first lattice of rods, the first side coupler is formed of a second lattice of rods, and the second side coupler is formed of a third lattice of rods.

4. The mobile computing device holder of claim 1, wherein the mobile computing device base is coupled to the base bracket.

5. The mobile computing device holder of claim 4, wherein the first side coupler is perpendicular to the second side coupler.

6. The mobile computing device holder of claim 1, wherein the tether device comprises a cord and a reel.

7. The mobile computing device holder of claim 1, wherein the tether device comprises a retractable cord.

8. The mobile computing device holder of claim 1, wherein the coupling apparatus comprises:
   a loop plate, wherein the loop plate comprises a hole through the loop plate; and
   a coupler plate coupled to the loop plate, wherein the coupler plate is configured to be coupled to the mobile computing device.

9. A corner mount fixture for holding a mobile computing device base, the corner mount fixture comprising:
   a base bracket, wherein the base bracket is formed of a first lattice of rods lying in a first plane;
   a first side coupler coupled to the base bracket, wherein the first side coupler is formed of a second lattice of rods lying in a second plane; and
   a second side coupler coupled to the base bracket, wherein the second side coupler is formed of a third lattice of rods lying in a third plane;
   wherein the base bracket is configured to couple to the mobile computing device base,
   and wherein the first and second side coupler are configured to couple to a piece of furniture.

10. The corner mount fixture of claim 9, wherein:
    the second plane is perpendicular to the first plane;
    the third plane is perpendicular to the first plane; and
    the second plane is perpendicular to the third plane.

11. The corner mount fixture of claim 9, wherein the base bracket is in the shape of a polygon.

12. The corner mount fixture of claim 9, wherein the first and the second side couplers are each in the shape of a rectangle.

13. The corner mount fixture of claim 11, wherein the base bracket is in the shape of an eight-sided polygon.

14. The corner mount fixture of claim 11, wherein the base bracket comprises:
    a trapezoid shaped base mount, wherein the base mount is configured to be coupled to the mobile computing device base;
    a first side wing coupled to the base mount; and
    a second side wing coupled to the base mount.

15. A method of mounting a mobile computing device base to a piece of furniture, the method comprising:
    coupling a plurality of rods together in the shape of a polygon to form a base bracket, wherein each of the plurality of rods lie in a base bracket plane;
    coupling a first side coupler to the base bracket such that a first side coupler plane is perpendicular to the base bracket plane;
    coupling a second side coupler to the base bracket such that a second side coupler plane is perpendicular to the base bracket plane;
    coupling the mobile computing device base to the base bracket; and
    coupling the first and the second side coupler to the piece of furniture.

16. The method of claim 15, wherein coupling the first and the second side coupler to the piece of furniture comprises coupling the first and the second side coupler to the piece of furniture such that a corner of the piece of furniture extends out between the first and the second side coupler.

17. The method of claim 15, wherein coupling the first and the second side coupler to the piece of furniture comprises:
    coupling the first side coupler to a first side of the piece of furniture; and
    coupling the second side coupler to a second side of the piece of furniture;
    wherein the base bracket sits on a top surface of the piece of furniture in response to coupling the first and the second side coupler to the piece of furniture.

18. The method of claim 17, wherein the base bracket is in the shape of an eight-sided polygon.

19. The method of claim 18, further comprising forming the first side coupler using a first rectangular lattice of rods.

20. The method of claim 19, further comprising forming the second side coupler using a second rectangular lattice of rods.

* * * * *